Patented Feb. 2, 1954

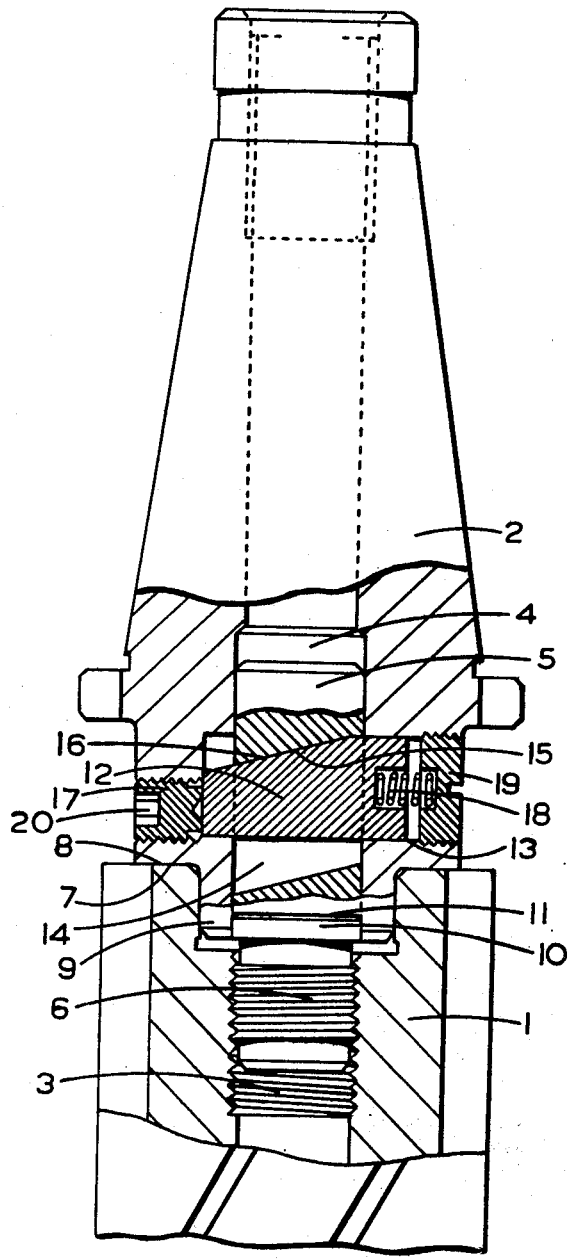

2,667,687

UNITED STATES PATENT OFFICE 2,667,687

TOOLHOLDER

Frank Henry Clarkson, Coventry, England

Application November 19, 1951, Serial No. 257,140

3 Claims. (Cl. 29—103)

This invention relates to milling cutters and like rotary machining tools and shanks or the like therefor and has for its object to provide means on a shank whereby a cutter or like tool may be detachably mounted by screwing the tool thereon, said means in accordance with this invention incorporating release mechanism whereby a cutter or the like that has become tightly screwed onto its shank after a machining operation can be freed so that it may be readily detached by unscrewing.

The present invention is particularly applicable to the mounting of larger sized milling cutters especially end mills e. g. those over 1½" in diameter.

In order that the invention may be readily understood and carried into practical effect reference is made to the accompanying drawing which is an elevation of a shank according to this invention mainly in axial plane section to reveal the construction of same.

In carrying the present invention into practice a preferred form is shown and hereinafter described as applied to the mounting of a milling cutter 1 on a shank 2 therefor.

The milling cutter 1 is provided with a co-axial threaded bore 3 which may be blind, whilst the shank 2 therefor is also provided with a co-axial bore 4 to receive a co-axial member in the form of a plug 5 which plug extends from the end of the shank 2 and is screw threaded at 6 to receive the milling cutter 1 screwed thereon.

The arrangement is such that the end face 7 of the milling cutter 1 may be screwed up to firm abutment against a similar surface 8 at the end of the shank 2.

As shown the milling cutter 1 has a spigotted engagement about a reduced portion 9 of the shank 2, the plug 5 having a flange 10 engaging a transverse groove 11 across the end of the reduced portion 9 to positively prevent rotation of the plug 5 relative to the shank 2.

In order to normally restrain the plug 5 against axial movement in the shank and also provide release means to enable the milling cutter 1 to be freed for unscrewing, a transverse pin or the like release member 12 is provided which is arranged to pass through transverse bores 13, 14 in the shank 2 and plug 5 respectively.

In the preferred form of this invention shown the pin 12 is provided with an inclined surface 15 after the manner of a cotter pin and co-operates in a wedge-like manner with a complementary surface 16 formed by inclination of the transverse bore 14 in the plug 5.

When the milling cutter 1 is screwed onto the threaded portion 6 of the plug and into abutment with the end face 8 of the shank 2, the said pin 12 restrains the plug 5 against axial movement in the shank 2 so that the milling cutter 1 is firmly mounted in position. When it is desired to free the milling cutter 1 for unscrewing after a series of milling operations when the cutter has become extremely tightly screwed against the shank 2, means in the form of the screw 17 is provided for imparting axial movement to the pin 12 against the frictional load on the latter so that the co-action of the inclined surface 15 of the pin 12 with that of the plug 5 permits a limited degree of axial movement of the latter in an outward direction from the shank 2 sufficient to enable the milling cutter 1 to be freed so that it may be readily unscrewed by hand. For this purpose the inclined surface 15 of the pin 12 is on that side of same remote from the milling cutter 1, and the angle of inclination is of the order of 15° to provide a non-locking angle.

In order to urge the pin 12 to abutment with the screw 17 for the purposes of resetting the pin, the recessed end of said pin 12 remote from the screw 17 has bearing against same a compression spring 18 which takes abutment in a recessed screw 19 plugging the end of the transverse bore 13 in the shank 2. The screw 17 is preferably provided with a hexagonal recess 20 to receive an Allen key so that the screw may be turned to impart axial movement to the pin.

Thus with milling cutters and shanks therefor it accordance within this invention milling operations are expedited in that the milling cutters can be readily removed from the shank after use. Furthermore, the provision of a blind threaded hole in the milling cutter leaves the other end thereof unobstructed for the formation of end milling cutting edges, whilst the fact that the cutter does not require an integral shank enables an economy to be effected in high speed steel or the like metal from which milling cutters and the like tools are usually manufactured.

I claim:

1. A rotary tool and shank therefor comprising in combination a rotary tool having a co-axial threaded bore therein and a shank comprising a shank body part having a co-axial bore in an end face thereof and also a transverse bore closed at one end and communicating with said co-axial bore; a co-axial member non-rotatably located for axial movement in the co-axial bore of said shank body part and having a transverse bore formed with an inclined surface which bore registers with the transverse bore in the shank body part, whilst said co-axial member also has a threaded portion extending from the end face of the shank body part for receiving the rotary tool screwed thereon against said end face; a transverse member located in the transverse bores in said shank body part and co-axial member and having a complementary inclined surface co-acting with the inclined surface of the transverse bore in the co-axial member, so that outward movement of the latter relative to the shank body part is prevented except on axial movement of the transverse member; a screw in the transverse bore of the shank body part for abutment with one end of said transverse member in order to impart axial movement thereto for permitting limited outward axial movement of the co-axial member to free the rotary tool for unscrewing from the shank; and a spring between the closed end of the transverse bore in the shank body part and the other end of said transverse member for urging the latter to abutment with said screw.

2. A shank for receiving a rotary tool screwed thereon, comprising a shank body part having a co-axial bore therein open at the forward end and also a transverse bore communicating therewith; a co-axial member located for axial movement in the co-axial bore of said shank body part and having a threaded portion at the forward end of the latter for screw threaded engagement with a rotary tool so that the latter abuts against the said forward end of the shank body part, said co-axial member having a driving engagement with the forward end of the shank body part and also having a transverse bore therethrough substantially in register with the transverse bore of the shank body part; a transverse release member extending through said transverse bores for endwise movement therein and having an inclined surface for wedge-like co-action between the shank body part and the co-axial member to prevent outward axial movement of the latter relative to said shank body part except on endwise movement of said release member; and screw means engaging the shank body part for imparting endwise movement to the release member in order to permit limited outward axial movement of the co-axial member to free the rotary tool for unscrewing from the shank.

3. A shank for receiving a rotary tool screwed thereon, comprising a shank body part having a co-axial bore therein open at the forward end and also a transverse bore closed at one end and communicating therewith, said forward end being grooved; a co-axial member located for axial movement in the co-axial bore of said shank body part and having a threaded portion at the forward end of the latter for screw threaded engagement with a rotary tool so that the latter abuts against the said forward end of the shank body part, said co-axial member having projections engaging the grooved forward end of the shank body part for driving engagement therewith and also having a transverse bore therethrough substantially in register with the transverse bore of the shank body part; a transverse release member extending through said transverse bores for endwise movement therein and having an inclined surface for wedge-like co-action between the shank body part and the co-axial member to prevent outward axial movement of the latter except on endwise movement of said release member; a screw in the transverse bore of the shank body part for abutment with one end of said release member in order to impart endwise movement thereto for permitting limited outward axial movement of the co-axial member to free the rotary tool for unscrewing from the shank; and a spring between the closed end of the transverse bore in the shank body part and the other end of the release member for urging the latter to abutment with said screw.

FRANK HENRY CLARKSON.

References Cited in the file of this patent

UNITED STATES PATENTS

| Number | Name | Date |
| --- | --- | --- |
| 1,132,375 | Myers | Mar. 16, 1915 |
| 1,354,097 | Fitzsimmons | Sept. 28, 1920 |
| 1,607,732 | Fletcher | Nov. 23, 1926 |
| 1,851,261 | Pechacek | Mar. 29, 1932 |
| 2,040,263 | Layne et al. | May 12, 1936 |
| 2,400,856 | Thompson | May 21, 1946 |

OTHER REFERENCES

American Machinist, vol. 55, No. 22, Dec. 1, 1921, pages 874-878.